United States Patent
Brincho et al.

(10) Patent No.: US 11,816,583 B2
(45) Date of Patent: Nov. 14, 2023

(54) KNOWLEDGE ENGINE MODULE COLLECTIONS

(71) Applicant: INTUIT INC., Mountain View, CA (US)

(72) Inventors: Matthew Brincho, Mountain View, CA (US); David Hanekamp, Mountain View, CA (US); Peter Lubczynski, Mountain View, CA (US); Kevin McCluskey, San Diego, CA (US)

(73) Assignee: INTUIT, INC., Mountain View, CA (US)

( * ) Notice: Subject to any disclaimer, the term of this patent is extended or adjusted under 35 U.S.C. 154(b) by 176 days.

(21) Appl. No.: 17/163,136

(22) Filed: Jan. 29, 2021

(65) Prior Publication Data

US 2022/0245468 A1    Aug. 4, 2022

(51) Int. Cl.
*G06N 5/022* (2023.01)
*G06F 3/0482* (2013.01)
*G06F 18/40* (2023.01)

(52) U.S. Cl.
CPC .......... *G06N 5/022* (2013.01); *G06F 3/0482* (2013.01); *G06F 18/40* (2023.01)

(58) Field of Classification Search
CPC ....... G06N 5/022; G06F 16/00; G06F 3/0482; G06F 9/451; G06K 9/6253; G06K 9/6263; G06V 10/945
See application file for complete search history.

(56) References Cited

U.S. PATENT DOCUMENTS

| | | | | |
|---|---|---|---|---|
| 10,417,717 | B2* | 9/2019 | Yu | G06F 16/3329 |
| 10,505,825 | B1* | 12/2019 | Bettaiah | G06F 40/174 |
| 10,664,926 | B2* | 5/2020 | Wang | G06F 40/205 |
| 11,334,541 | B1* | 5/2022 | Domingo | G06F 16/9024 |
| 11,442,906 | B2* | 9/2022 | Viswanathan | G06F 16/211 |
| 2003/0229605 | A1* | 12/2003 | Herrera | G06N 5/046 706/47 |
| 2005/0278306 | A1* | 12/2005 | Dettinger | G06F 16/242 |
| 2008/0183687 | A1* | 7/2008 | Law | G06F 16/248 |
| 2019/0325329 | A1* | 10/2019 | Rais-Ghasem | G06F 16/325 |
| 2019/0347268 | A1* | 11/2019 | Griffith | G06F 16/221 |
| 2021/0201169 | A1* | 7/2021 | Fung Moo | G10L 15/1822 |

OTHER PUBLICATIONS https://quixy.com/blog/all-about-no-code-development/.

* cited by examiner

*Primary Examiner* — Dino Kujundzic
(74) *Attorney, Agent, or Firm* — Patterson + Sheridan, LLP

(57) ABSTRACT

Certain aspects of the present disclose provide techniques for generating a knowledge engine module collection. Techniques for generating the module collection include receiving input data comprising a first identifier, a second identifier, and a third set of fields. Based on the input data, a UI builder tool can retrieve a first set of artifact files and a second set of artifact files corresponding to a first module and a second module. The UI builder tool can generate a third set of artifact files based on the first set of artifact files, the second set of artifact files, and the input data.

17 Claims, 13 Drawing Sheets

```
<KE>
  <ParentInfo>
    <name>Jane</name>
    <birthday>1975-01-01</birthday>
  </ParentInfo>
  <AgeAtBeginningOfYear>45</AgeAtBeginningOfYear>
</KE>
```

FIG. 4A

```
<KE>
  <Average>
    <first>10</first>
    <second>1</second>
    <sum>11</sum>
    <average>5.5</average>
  </Average>
</KE>
```

FIG. 4B

| | A | B | C | D | E | F |
|---|---|---|---|---|---|---|
| 1 | Module ID | Module Name | Version used | Latest Version | Instance Name | Repeating Module |
| 2 | uuid1 | ParentInfo | 1 | 1 | Dad | no |
| 3 | uuid1 | ParentInfo | 1 | 1 | Mom | no |
| 4 | uuid2 | Average | 1 | 1 | AverageParentsAge | no |

FIG. 5

| | A | B | C | D | E | F | G | H | I |
|---|---|---|---|---|---|---|---|---|---|
| 1 | instance | field | role | type | Input / Constant / Wiring | Container | Exposed Name | Friendly Name | Explanation |
| 2 | | | | | | | Name | | |
| 3 | | | | | | | | | |
| 4 | Dad | name | input | string | John | Dad | Name | Dad's name | N/A |
| 5 | Dad | birthday | input | date | 1/1/1975 | Dad | birthday | Dad's birthday | N/A |
| 6 | Dad | AgeAtStartOfYear | internal | decimal | 45 | Dad | | Dad's age as of beginning of year | Dad's age as of the beginning of the year (45) comes from finding out how long it was between the beginning of the year (1/1/2020) and Dad's birthday (1/1/1975). |
| 7 | Mom | name | input | string | Jane | Mom | Name | Mom's name | N/A |
| 8 | Mom | birthday | input | date | 2/2/1972 | Mom | birthday | Mom's birthday | N/A |
| 9 | Mom | AgeAtStartOfYear | internal | decimal | 47 | Mom | | Mom's age as of beginning of year | Mom's age as of the beginning of the year (47) comes from finding out how long it was between the beginning of the year (1/1/2020) and Mom's birthday (2/2/1972). |
| 10 | AverageParentsAge | first | wired | decimal | 45 | | | Dad's age as of beginning of year | |
| 11 | AverageParentsAge | second | wired | decimal | 47 | | | Mom's age as of beginning of year | |
| 12 | AverageParentsAge | sum | internal | decimal | 92 | | | Parents sum of numbers | Parent's sum of numbers (92) comes from adding up Dad's age as of beginning of year (45) and Mom's age as of beginning of year (47). |
| 13 | AverageParentsAge | average | output | decimal | 46 | | AverageAgeOfParents | average age of parents | Average age of parents (46) comes from dividing the Parent's sum of number (92) by 2. |

<KE>
    <Family>
702 —   <Dad>
            <Name>John</Name>
            <Birthday>1975-01-01</Birthday>
        </Dad>
704 —   <Mom>
            <Name>Jane</Name>
            <Birthday>1972-02-02</Birthday>
        </Mom>
706 —   <AverageAgeOfParents>46</AverageAgeOfParents>
    </Family>
</KE>
```

Dad's Name

[    ]

[ Next ]

Dad's Name

[ John ]

[ Next ]

Dad's Birthday

[    ]

[ Next ]

Dad's Birthday

[ 1/1/1975 ]

[ Next ]

Mom's Name

[ ]

[ Next ]

Mom's Name

[ Jane ]

[ Next ]

Mom's Birthday

[ ]

[ Next ]

Mom's Birthday

[ 2/2/1972 ]

[ Next ]

FIG. 8H

KNOWLEDGE ENGINE MODULE COLLECTIONS

INTRODUCTION

Aspects of the present disclosure relate to generating a module collection from previously existing modules based on a knowledge engine.

BACKGROUND

Organizations, such as businesses, governing authorities, and other such entities have implemented compliance regimes with the assistance of knowledge engines. In some cases, an organization can implement a compliance regime through a software program product that includes a knowledge engine service.

Engineering of knowledge engines allows experts to encode rules and regulations about compliance problems in a machine readable way through the use of calculation graphs and completeness graphs. Various types of rules about a topic can be defined through programming code, such as what data is needed under certain circumstances, how to ask for data, and how to calculate results from that data. These rules can be bundled together into a set of rules called a module.

However, conventional methods for adding and/or modifying calculation and completeness graphs of modules are resource-intensive (e.g., time, money, computing, personnel, etc.) and can require a deep understanding of how to write programming code. Even further, conventional methods lack the ability to reuse modules or combine modules into a larger, more comprehensive module which allows for the rules of the previous modules to be used together. In some cases, by conventional methods, it may take significant time to build a new module combining aspects of previous modules, ultimately resulting in a product that is not up-to-date.

Therefore, a solution is needed that can overcome the shortcomings of the conventional methods so as to combine previous modules into a module collection, based on the knowledge engine, without requiring extensive knowledge of coding.

BRIEF SUMMARY

Certain embodiments provide a method of creating a module collection. The method includes receiving a first input in a first user interface, comprising: a first identifier corresponding to a first module, wherein the first module comprises a first set of fields, wherein each field in the first set of fields corresponds to a node in a knowledge engine, wherein each node corresponds to an operation of the knowledge engine; and a second identifier corresponding to a second module, wherein the second module comprises a second set of fields, wherein each field in the second set of fields corresponds to a node in a knowledge engine, wherein each node corresponds to an operation of the knowledge engine; receiving a second input in the first user interface, comprising; a third set of fields, wherein each field in the third set of fields creates a relationship between at least one field in the first set of fields and one field in the second set of fields; retrieving, from an artifact repository, a first set of artifact files corresponding to the first module and second set of artifact files corresponding to the second module; and generating a third set of artifact files based on the first set of artifact files, the second set of artifact files, and the relationship between at least one field in the first set of fields and one field in the second set of fields, wherein the third set of artifact files corresponds to the second input.

Other embodiments provide systems to perform the aforementioned methods to increase efficiency and accuracy of creating a module collection based on a knowledge engine. Additionally, other embodiments provide non-transitory computer-readable storage mediums comprising instructions for generating a module collection based on a knowledge engine.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIGS. 4A-4B depict example input data files generated based on the input data to a first module interface and the second module interface.

FIG. 5 depicts an example instance view of a collection interface.

FIG. 6 depicts an example wiring view of a collection interface based on an instance view.

FIG. 7 depicts an example input data file generated from the input data to a wiring view.

FIGS. 8A-8I depict an example client UI view.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
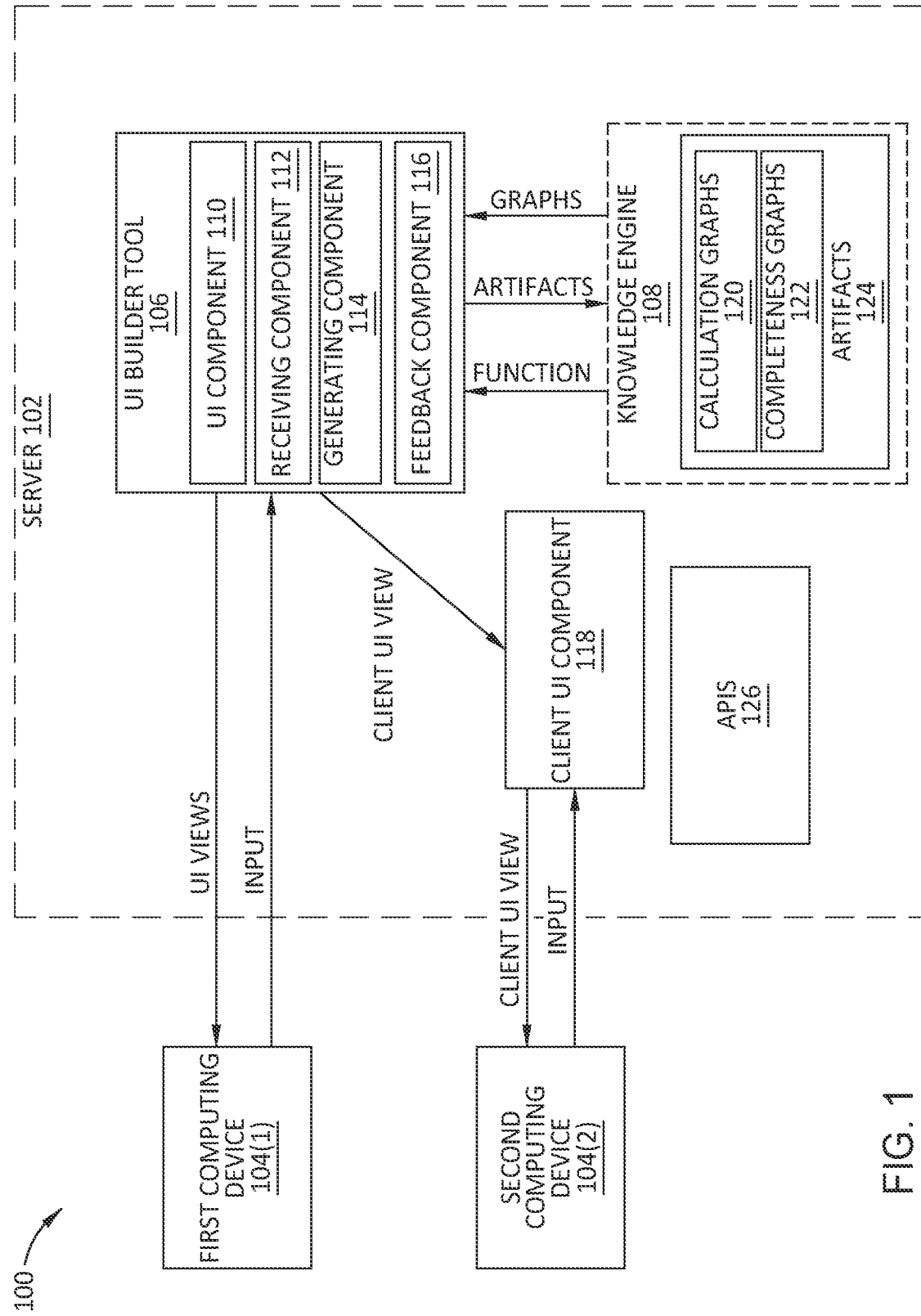
FIG. 1 depicts an example computing environment.

Aspects of the present disclosure provide apparatuses, methods, processing systems, and computer-readable mediums for generating a module collection from previously created modules based on a knowledge engine.

Brief Introduction to Knowledge Engines

In order to create a module collection, users can utilize a knowledge engine, which generates outputs by performing computations based on nodes within graphs of the knowledge engine. The knowledge engine can include calculation graphs and completeness graphs representing the current status of a software program product (e.g., within the nodes of the knowledge engine). The knowledge engine can further include data structures, operations, data types, etc., of calculation graphs and completeness graphs that a server can utilize in generating artifacts defining the calculation graphs and completeness graphs. The knowledge engine may also execute the calculation graph(s), completeness graph(s), and client UI views as defined by artifact files created by knowledge engine modules.

When the calculation graph is executed by the knowledge engine, the knowledge engine may perform calculations based on input data to a user interface. Therefore, the user may enter input data to the user interface in order to perform desired calculations through the calculation graph. Further, when the completeness graph is executed by the knowledge engine, the server determines if all required data for the required calculations has been entered into the user interface.

Brief Introduction to Knowledge Engine Modules

In order to generate a module collection, users can also utilize a user interface (UI) builder tool which can interface with a knowledge engine. The UI builder tool can be hosted by a server to which the user can access and/or connect to a computing device. The UI builder tool can provide a set of UI views to a computing device of the user. In some cases, the set of UI views can be tabular.

The set of UI views may be used to create or modify a software program product that represents a compliance regime of rules and regulations. For example, in the instance of a software program product that represents a compliance regime of rules and regulations, if the user is attempting to add and/or modify rules and regulations, the set of UI views can break down the type of input. In the set of UI views corresponding to a modification of the software program product ("module interface"), the computing device can receive input data from the user to create and/or modify the rules and regulations of the software program product. Altogether, the module interface combined with the new rules and regulations of the software program product can be referred to as a "module." However, in some embodiments, a module may also include the artifact files defining a calculation graph, completeness graph, and client UI view associated with the rules and regulations (a "module code"). In some embodiments, a UI builder tool can generate the module code.

Further, in some cases, the user can call an application programming interface ("API") corresponding to a particular artifact file in order to cause the knowledge engine to execute an artifact file and return the result to the user. In some cases, an API may correspond to more than one particular artifact file and may cause the knowledge engine to execute more than one artifact file. In particular, this allows the user to make sure that the module includes all necessary rules and regulations. In some embodiments, calling an API also may inform the user that the input data received in the module interface is not complete, and therefore, artifact files of the module code cannot be executed properly. In other embodiments, if an API is called and the input data received in the module interface is not complete, the API will complete the input data based on the existing input data from the user. Therefore, the APIs corresponding to artifact files of the module code benefit the user by allowing him/her to keep track of what rules and regulations the module includes, as well as if the module is complete or not and if more work is necessary, without having extensive knowledge of coding.

The UI builder tool can generate the module code based on the calculation graphs and completeness graphs in the knowledge engine. After the UI builder tool generates the module code, the module code can be stored with a unique identifier. Based on the unique identifier, the UI builder tool can retrieve the associated calculation graph(s) and completeness graph(s) for later use. The UI builder tool can also generate the client UI views based on the input data to the module interface. The client UI view can be a template UI for a client user to enter data.

Brief Introduction to Knowledge Engine Module Collections

The user can repeat the process described above to generate two or more module codes based on two or more module interfaces, where each module code corresponds to its own unique identifier. In that case, the UI builder tool may generate the two or more module codes based on calculation graphs and completeness graphs stored in the knowledge engine.

In some cases, a separate set of UI views (a "collection interface") can be utilized to combine multiple modules in order to generate a third set of artifact files corresponding to a module collection (a "collection code"). The collection interface, along with the combined rules and regulations of the multiple modules, can be referred to as the module collection. In addition, in some embodiments, the module collection also includes the collection code.

The collection code, similarly to a module code, may define a calculation graph, a completeness graph, and a client UI view. At the collection interface, the computing device can receive input data from the user to generate the collection code. The collection interface may include two or more UI views. After receiving input from the computing device to the collection interface, the UI builder tool can generate a collection code (e.g., artifact files defining a calculation graph, a completeness graph, and a client UI view, etc.), based on the calculation and completeness graphs corresponding to the modules identified by the unique identifiers. In this way, a user may combine the changes made by previous modules without requiring the knowledge and resources normally required to create an entirely new program. For example, the user is able to combine operations for the calculation graphs and completeness graphs for two modules efficiently, saving time and money. Further, the user is able to combine the operations for the calculation graphs and completeness graphs without needing the extensive knowledge of coding that would normally be required to combine said operations.

The UI builder tool can generate the collection code based on the input data to the collection interface and the calculation graphs and completeness graphs from the module codes in the knowledge engine. For example, the UI builder tool can use the data types and data structures of the knowledge engine to validate the input data representing the calculation graph and/or completeness graph in the module code. Since the UI builder tool generates the collection code for the user, the user is not required to have an extensive knowledge of coding, which in turn saves time and money that could have been spent developing the modification to the software program product.

With the collection code generated by the UI builder tool, the user can call one or more APIs associated with the module collection to confirm that all necessary data has been input. Therefore, the UI builder tool allows the user to input data to the collection interface to automatically generate a new code, which does not require the knowledge and resources of manually generating a new code. The user can then test and confirm via calling the APIs that the module collection contains all desired rules and regulations. The method allows for subject matter experts to develop and combine programs without extensive knowledge of coding, which cannot be done by conventional methods.

Example System of Computing Devices and Server for Generating a Module Collection FIG. 1 depicts an example computing environment 100 for generating a module collection.

As illustrated, the example computing environment 100 includes a server 102 interacting with one or more computing devices 104 (e.g., first computing device 104(1) and second computing device 104(2)). The server 102 can include a user interface (UI) builder tool 106, a knowledge engine 108, a client UI component 118, and APIs 126.

A computing device 104 can include a computer, laptop, tablet, smartphone, a virtual machine, container, or other computing device with the same or similar capabilities. In some cases, the computing device 104 can be associated with a user of a software program product. The user can, via the computing device 104 (e.g., first computing device 104(1)), input data to create a module or module collection. For example, the first computing device 104(1) can access and/or receive UI views that make up a first module interface from a UI builder tool 106 in a user and/or editing application for the software program product. In some cases, the UI views may be tabular. In those cases, the UI views may consist of multiple rows and columns containing fields that may receive input data. Through the UI views, the user can input the data for generating a client UI view that the server 102 can generate and provide to client users of the software program product. The client user can use another computing device 104 (e.g., a second computing device 104(2)) to access the software program product. In some cases, the user and the client can use the same computing device.

The server 102 can also include a knowledge engine 108. The knowledge engine 108 can include calculation graphs and completeness graphs representing rules and regulations of a knowledge domain for generating result(s). For example, in a tax knowledge domain, the calculation graph and completeness graph can represent the rules and regulations for generating tax values, such as a tax refund, number of dependents, taxable deductions, and so forth. In some embodiments, the knowledge engine receives the calculation graph and completeness graphs from a server in conjunction with input data from a user each time the knowledge engine executes the calculation graph and completeness graphs. A software program product can utilize the data stored in the knowledge engine 108 (e.g., calculation graphs 120 and completeness graphs 122) by requesting the data or requesting that the knowledge engine execute a particular graph and return the result. In some cases, knowledge engine 108 can be hosted on one or more servers 102. In other cases, the server 102 can include a knowledge engine service that accesses the server(s) hosting the knowledge engine 108.

A knowledge engine 108 may be updated to provide added and/or modified rules and regulations for a software program product based on the current knowledge domain. The current knowledge domain may be updated by the introduction of new calculation and completeness graphs which can be stored in calculation graphs 120 and completeness graphs 122, respectively.

In one embodiment, a UI builder tool 106 of server 102 can provide a first module interface to a first computing device 104(1) associated with the user to add and/or modify rules and regulations in a software program product. The UI builder tool 106 can include a UI component 110, a receiving component 112, a generating component 114, and a feedback component 116.

The UI component 110 can generate the first module interface to be provided to the first computing device 104(1). In some cases, the generated UI views of the first module interface may be tabular.

Figure 2:
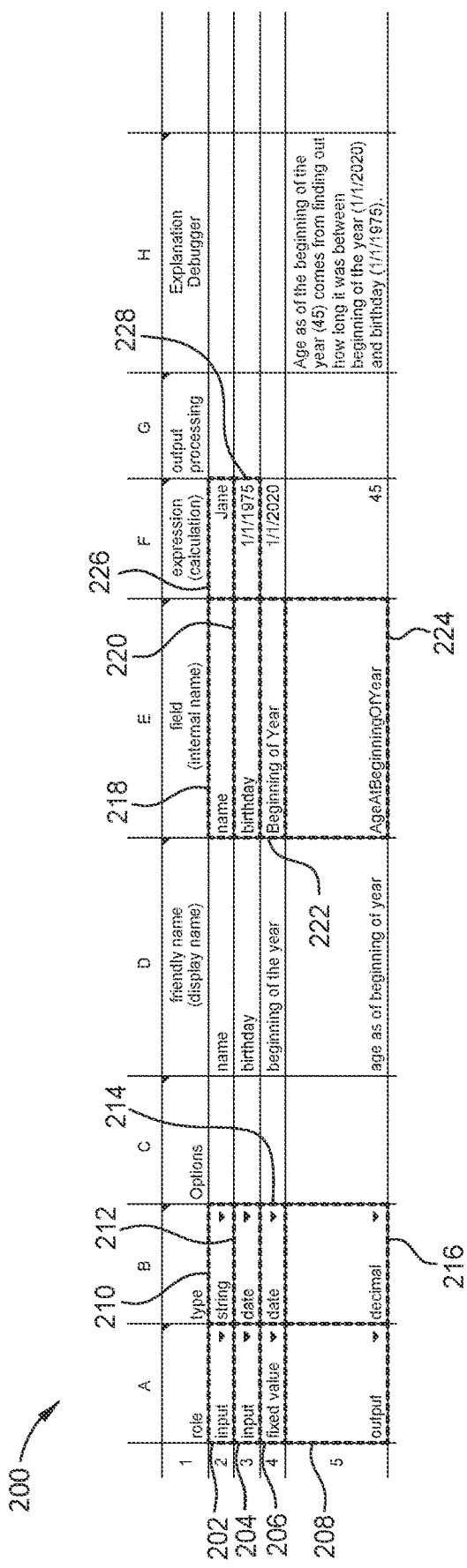
FIG. 2 depicts an example user interface for generating a first calculation graph corresponding to a first module.
Figure 3:
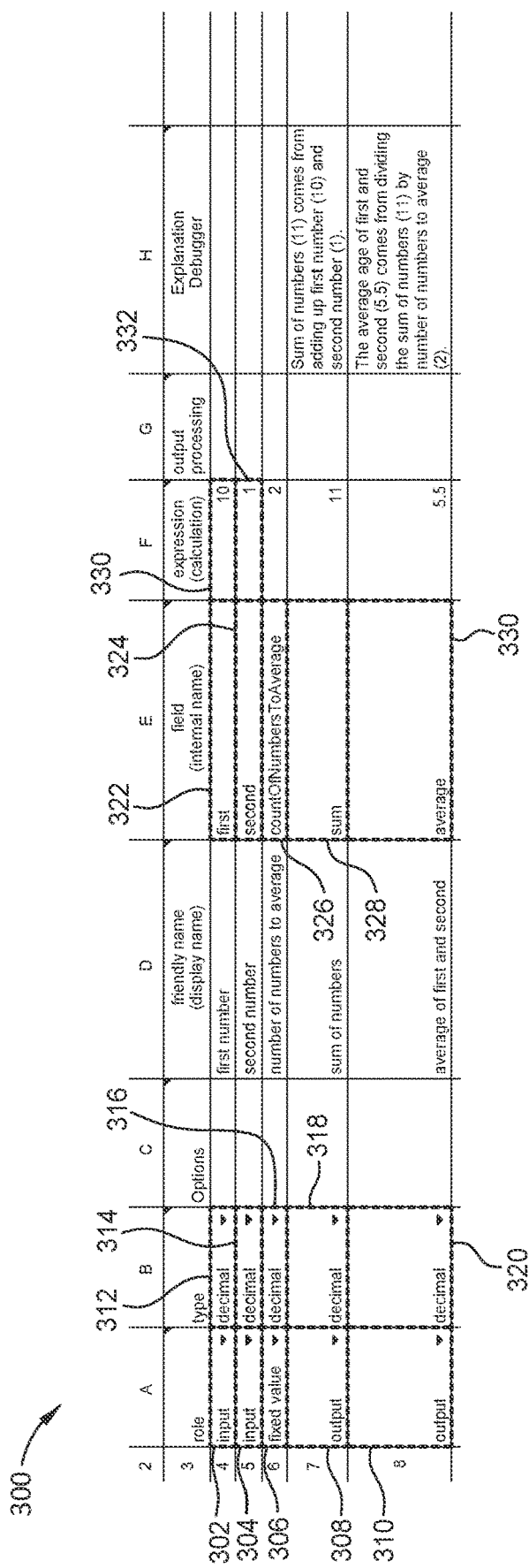
FIG. 3 depicts an example user interface for generating a second calculation graph corresponding to a second module.

The first module interface generated by the UI builder tool 106 (e.g., via the UI component 110) can include a set of initialization scripts that include data from the knowledge engine 108, such as operations (e.g., functions) that can be selected by the first computing device 104(1) for defining calculation graphs, completeness graphs, or client UI views. Input data provided by the user to the first module interface can define the calculation graph in a first UI view as illustrated by FIG. 2. The input data can further define a completeness graph in a second UI view, and a client UI view in a third UI view of the first module interface to be displayed on a computing device (e.g., computing device 104(2)). In some cases, the user can input data to a second module interface by the same process, as illustrated by FIG. 3.

In one embodiment, the generating component 114 can generate a set of artifact files corresponding to the module (a "module code") defining the calculation graphs, completeness graphs, client UI view for the module based on the input data to the module interface. The module code may include one or more XML, files, JSON files, or other files. The UI builder tool 106 may access the knowledge engine to retrieve the most current calculation graph, completeness graph, and UI client view for that software programming product. The generating component 114 can include an algorithm that reviews the input data (e.g., the operations, dependencies, etc.) from each module interface to create a module code based on the input data and the retrieved calculation and completeness graphs. Each module code may be stored in the knowledge engine 108 at artifacts 124 with a corresponding unique identifier.

The UI builder tool 106 may provide the unique identifier to the knowledge engine 108 (or a knowledge engine service), which allows the UI builder tool 106 to locate the module code for future use. Upon retrieval of the code, the generating component 114 can generate the calculation graph of calculation graphs 120 and the completeness graphs of completeness graphs 122 and provide them to UI builder tool 106.

A collection interface may be used by a user at computing device 104(1) to create a module collection based on the calculation graphs and completeness graphs stored in the knowledge engine 108 that correspond to the first and second modules. In some embodiments, the UI views of the collection interface may be a tabular user interface. A first view of the collection interface (the "instance view") can define which module codes can be utilized based on input data received from the user, as illustrated in FIG. 5. After the input data is input to the instance view, a second UI view of the collection interface (the "wiring view") is automatically generated by the UI builder tool 106. In the wiring view, the UI builder tool 106 automatically populates the fields corresponding to the fields defined in the first and second module interfaces based on the unique identifiers input to the instance view, as illustrated in FIG. 6. In some embodiments, the user can input data to create relationships between the fields of the wiring view.

The input data can be received by receiving component 112 and used by generating component 114 to generate a set of artifact files (e.g., data defining a calculation graph, completeness graph, client UI view, etc.) corresponding to the module collection (a "collection code"). The generating component 114 can generate a collection code as one or more of an XML file, JSON file, or other type of file. The collection code can define the calculation graph, completeness graphs, and a client UI view as a programming code based on the input data to the instance view and the wiring view. In some embodiments, the collection code is stored in the knowledge engine (e.g., in artifacts 124) with a unique identifier associated with the module collection.

In other embodiments, the UI builder tool 106 can use the knowledge engine 108 to generate the calculation graph, completeness graph, and client UI view. With the input data received from the first computing device 104(1), the generating component 114 of the UI builder tool 106 can include an algorithm that reviews the input data (e.g., the operations, dependencies, etc.) from the instance view, the wiring view, the first module code, and the second module code.

After the generating component 114 generates the collection code, the collection code may be stored in the knowledge engine 108 at artifacts 124. In some embodiments, from the module interface at computing device 104(1), the user can call an API of APIs 126 corresponding to a particular artifact file of the collection code in order to cause knowledge engine 108 to execute the artifact file (e.g., calculation graph, completeness graphs, and/or a client UI view). In some embodiments, an API can cause the knowledge engine 108 to run the calculations of the calculation graph based on input test data to the collection interface, another API can cause the knowledge engine 108 to run the completeness graph to make sure all required input test data was input to the collection interface, and/or another API can cause the knowledge engine 108 to display the client UI view to the user. In some embodiments, the user may call an API that provides an explanation of how the calculations of the calculation graph are performed. By running the APIs, the user can make sure that all desired rules and regulations of the module collection have been implemented and all necessary data has been input.

The UI builder tool 106 can then provide the unique identifier corresponding to the module collection to the knowledge engine 108 (or a knowledge engine service). Like the unique identifiers corresponding to the modules, the unique identifier corresponding to the module collection can then be provided to the knowledge engine 108 by the UI builder tool 106 so that the knowledge engine 108 can generate the collection code for future uses (e.g., creating another module collection). The unique identifier corresponding to the module collection and the collection code may also be stored in the knowledge engine (e.g., at artifacts 124) with the unique identifiers corresponding to the modules and the module codes.

Example User Interface(s) for Generating a Calculation Graph by a Knowledge Engine Module Interface FIG. 2 depicts an example user interface 200. The user interface 200 is one of the UI views from the first module interface provided from a server (e.g., server 102) to a computing device (e.g., computing device 104(1)).

As illustrated, this particular user interface 200 includes a table for a user to enter input data regarding a calculation graph (e.g., how to perform a new and/or modified operation) of the software program product. For example, in the user interface 200, each column (e.g., "role" and "type") indicates a type of data and operation to be performed by the knowledge engine. Each row includes data input by a user for generating the calculation graph. The data entered into a row can represent a description of a respective node in the calculation graph or an operation to be performed by the node. Together, the rows represent multiple nodes of the calculation graph that will perform one or more operations to generate a result. For example, a user can input data to a first field (e.g., field 218) in a first row to define a first node with a node description of "Name", and input data to a second field (e.g., field 210) in the first row to include in the description the type of data (e.g., "string" or "decimal") to be entered in a client UI view, as later illustrated in FIGS. 8A-8B. The user can further input data to a first field (e.g., field 220) in a second row to define a second node with a node description of "Birthday", and input data to a second field (e.g., field 212) in the second row to include in the description the type of data (e.g., "date") to be entered in a client UI view, as later illustrated in FIGS. 8C-8D. In a similar fashion, the user can input data to fields (e.g., fields 208, 216, and 224) of other rows corresponding to a third node to include a description and definition of the relationship between the two nodes by an operation. For example, the user can input data to a first field (e.g., field 224) in a third row to define a third node with a node description of "AgeAtBeginningOfYear", and input data to a second field (e.g., field 216) in the third row to include in the description the type of data (e.g., decimal) to output in the client UI view using the input data in rows 2-3. As described above, the operation can be an operation from a knowledge engine (e.g., knowledge engine 108). The nodes of the calculation graph can be chained together to perform more than one operation (e.g., the input data to describe a calculation for the "age as of beginning of year" that relates the nodes described in rows 2-3). In some cases, the user input can define a calculation graph with more than one operation.

User interface 200 further provides columns for additional options included for the user to input data. The user interface 200 includes columns for the names associated with the data (e.g., "friendly name (display name)" and "field (internal name)"). In some embodiments, those names associated with the data appear as a title next to an input field for user input in the client interface view. Further, the user interface 200 includes a column for input data associated with the operation to be performed (e.g., "expression (calculation)"). In some cases, the fields (e.g., fields 202-208 and 210-216) within a column regarding operations can include a drop-down menu that includes a list of operations from the knowledge engine that are embedded within the user interface 200. For example, certain fields (e.g., 202, 204, 206, and 208) in the "role" column would have a drop down menu to allow the user to assign a role (e.g. "input", "output", "fixed value", or "internal") associated with the data. For some roles (e.g., "input"), the field (e.g., field 202 or 204) would require user input in order for the knowledge engine to perform an operation corresponding to the node associated with the field. For other roles (e.g., "output", "fixed value", and "internal"), the field (e.g., fields 206 or 208) would not require user input for a knowledge engine to perform an operation corresponding to the node associated with the field. In another example, certain fields (e.g., fields 210, 212, 214, and 216) in the "type" column would have a drop down menu to allow the user to choose a type of data (e.g., "string", "date", or "numerical") to be input by the client user.

Additionally, input data from the user may be used to generate an artifact file defining a completeness graph for the first module. In some embodiments, the input data to generate the artifact file can be input to a separate UI view of the first module interface. The input data regarding the completeness graph can relate to the required and/or conditional data defined in user interface 200 of FIG. 2 for generating the calculation graph. For example, a first column can include input data representing the type of data (e.g., corresponding to a data field name in a column of user interface 200 of FIG. 2). A second column can include a representation of a rule associated with the type of data (e.g., whether the data is required or optional).

FIG. 3 depicts an additional example user interface 300. The user interface 300 is one of the UI views from the second module interface provided from a server (e.g., server 102) to a computing device (e.g., computing device 104(1)). Similar to user interface 200, the input data entered into user interface 300 (e.g., in fields 302-330) by the user is used to generate a calculation graph for the second module. Additionally, similarly to inputting data to generate a completeness graph for the first module as described above, the user may input data to generate a completeness graph for the second module.

Example Knowledge Engine Module Input Data File for Executing a Calculation Graph FIGS. 4A and 4B depict example input data files 400 and 402, respectively, which are generated by a server (e.g., server 102). Each input data file is generated via the server based on the input data provided to a module interface. FIG. 4A represents an input data file representing input test data to be used by a knowledge engine (e.g., knowledge engine 108) when executing the calculation graph corresponding to a first UI view (e.g., user interface 200) of a module interface. FIG. 4B represents an input data file representing input test data to be used by the knowledge engine (e.g., knowledge engine 108) when executing the calculation graph corresponding to a first UI view (e.g., user interface 300) of a second module interface different from the first module interface.

Input data files 400 and 402 are examples of input data that can be used by the knowledge engine when an API (e.g., an API of APIs 126) is called by the user to test the module. For example, if a user inputs test data (e.g., "Jane" and "1975-01-01") to a first module interface (e.g., to fields 226 and 228 at user interface 200) and calls the API to test the calculation graph, the API will input an input data file (e.g., input data file 400) based on the input test data to the knowledge engine to be used when the knowledge engine executes the calculation graph. As another example, if a user inputs test data (e.g., "10" and "1") to a second module interface (e.g., fields 330 and 332 at user interface 300) and calls the API to test the calculation graph, the API will input an input data file (e.g., input data file 402) based on the input test data to the knowledge engine to be used when the knowledge engine executes the calculation graph.

Example Instance View of a Knowledge Engine Module Collection

FIG. 5 depicts an example UI interface 500 for the instance view of a collection interface on a computing device (e.g., computing device 104(1)).

A user can input data to the instance view which can be used by a server (e.g., server 102), to create a collection code associated with a module collection. As described above, a module is associated with a module code and includes at least a module interface and a set of rules and regulations of a software program product. A module collection includes the collection interface and a new set of rules and regulations, which may be combined sets of rules and regulations from two or more modules, associated with a collection code based on the module codes of the two or more modules and input data to a collection interface. The collection interface may include at least an instance view (e.g., user interface 500) and a wiring view (e.g., user interface 600 as displayed later in FIG. 6).

After the UI builder tool 106 generates each module code, the module codes can be stored in the knowledge engine (e.g., at artifacts 124), as described above. In some embodiments, each respective unique identifier (e.g., "uuid1" or "uuid2") is associated with a module that corresponds to a module code. While uuid1 and uuid2 are used as unique identifiers for simplicity, one of ordinary skill in the art would recognize that a uuid1 and uuid2 are only examples of unique identifiers, and other unique identifiers could be used.

As illustrated, this particular user interface 500 includes a table for a user to enter input data regarding the unique identifiers associated with each module into a set of fields. For example, in the user interface 500, each column indicates a type of data corresponding to the first module or the second module. In some embodiments, the type of data could also correspond to a third module. Each row includes data input by the user for generating a wiring view, which would later be used by the server, to generate the calculation graph, completeness graph, and client UI view of the module collection.

The first two columns (e.g. "Module ID" and "Module Name") indicate one of the first or second module codes to be used in generating the module collection. For example, the user can input a unique identifier to certain fields (e.g., fields 502, 504, and 506) in the "Module ID" column. The user can also input a name associated with the first unique identifier into certain fields (e.g., 508, 510, and 512) in the "Module Name" column. In one embodiment, if the first unique identifier has already been input to the first UI view, the UI builder tool 106 will populate the corresponding in the "Module Name" column field with the name based on the corresponding module code. In other embodiments, the input to the "Module Name" column may be selected from a drop down menu. In those embodiments, if a "Module Name" is selected from the drop down menu, the UI builder tool will populate the corresponding unique identifier. In some embodiments, the user can input data defining one or more words in a client UI view title wherein the title will be displayed next to a user interface element in the client interface view. Further, the user can input data representing the version number of the module corresponding to a user identifier.

In some embodiments, the user may input data to a field (e.g., a field in set of fields 516) indicating if the knowledge engine should repeat an execution of the calculation and completeness graphs corresponding to a unique identifier. For example, if the repeating field in the same row as a unique identifier receives input (e.g., a repetition indicator) indicating the calculation graph and/or completeness graph corresponding to a unique identifier should be executed more than once, the calculation graph and completeness graphs for that unique identifier will be executed an amount of times based on input received in the client UI view. In some embodiments, the user may choose a repetition indicator from a drop-down menu. In those cases, the repetition indicator may indicate that the knowledge engine should not repeat an execution (e.g., if a user chooses "no" from the drop down menu). Further in those cases, the repetition indicator may indicate that the knowledge engine should repeat an execution based on an amount of times indicated by input received in the client UI view, where the knowledge engine may not execute an artifact file if the indicated amount of times is zero (e.g., if a user chooses "yes—can have 0 rows" from the drop down menu). Even further in those cases, the repetition indicator may indicate that the knowledge engine should repeat an execution based on an amount of times indicated by input received in the client UI view, where the knowledge engine must execute an artifact file at least once (e.g., when a user chooses "yes—at least one row required" from the drop down menu).

The user may input the unique identifiers in many different combinations. For example, the user can input to a first field (e.g., field 502) the unique identifier corresponding to the first module and can input to a second field (e.g., field 506) the unique identifier corresponding to the second module code. In some embodiments, the user can input the same unique identifier to both a first and a second field (e.g., fields 502 and 504). In those embodiments, the same module can be used in multiple instances, wherein each instance of the same module will correspond to a set of fields that can receive input data in the wiring view as shown later in FIG. 6. The user can further input to a third field unique identifier corresponding to the first module code, the unique identifier corresponding to the second module code, or another unique identifier corresponding to another module code. For each field that receives a unique identifier as input, the user can also input data to a field (e.g., a field in set of fields 514) describing a respective instance name to a corresponding field.

The UI builder tool 106 can provide the unique identifier to a knowledge engine (e.g., knowledge engine 108) which can then retrieve the associated artifact files.

Example Wiring View of a Knowledge Engine Module Collection

FIG. 6 depicts example UI interface 600 for the wiring view of a collection interface that a server (e.g., server 102) uses to create the collection code associated with the module collection.

After the unique identifiers are input to an instance view (e.g., user interface 500), a wiring view of the collection interface (e.g., user interface 600) is automatically generated by a UI builder tool (e.g., UI builder tool 106). In the wiring view, the UI builder tool automatically populates fields corresponding to the fields in the first and second module interfaces based on the unique identifiers input to the instance view. Like the module interfaces, each row to which the user can input data represents a node of a graph, such as a calculation graph.

The user can further input data to a first field (e.g., field 602) corresponding to a first node of a calculation graph corresponding to the module collection. In some cases, the first field (e.g., field 602) may be one of the fields that is automatically populated based on the unique identifiers input to the instance view. The input data may include a node description and include in the description the type of data to be entered and an example of that data. The first field of the wiring view can correspond to any one of the fields in the first and second module interfaces.

The user can further input data to a second field (e.g., field 604) in the wiring view to assign a role of the first field in the wiring view. In some cases, the user can assign the role of the first field from a drop-down menu.

In some embodiments, the role of the first field can be "input", "fixed value", "output", "internal", "wired", or another role. If the user inputs the role of the first field as an "input" role, the UI builder tool 106 will require input from a client user in order for the knowledge engine to perform an operation. If the user inputs the role of the first field as a "wired" role, the UI builder tool 106 creates a relationship between the input data of the first field and the input data of a third field, indicated by the user, in the wiring view. If the user inputs the role of the first field as "fixed value", the data used to perform an operation corresponding to the field will be the same data each time the module collection code is executed. Additionally, if the user inputs the role of the first field to be "internal", the knowledge engine will perform a calculation of a node corresponding to the first field based on the input data to the first field, but will not display the result to a client user. Meanwhile, if the user inputs the role of the first field to be "output", the knowledge engine will perform a calculation of the node corresponding to the first field based on the input data to the first field, and will display the result to the client user.

In some cases, if a first field in the wiring view corresponds to a second field in a module interface (e.g., field 602 corresponding to field 202), the selection of roles available for the user to choose may be restricted. For example, if the role of the second field in the module interface is "input", the role of the first field in the wiring view may be restricted to "input", "fixed value", or "wired". Further, in those embodiments, if the role of the second field in the module interface is "output", the role of the first field in the wiring view may be restricted to "output" or "internal".

For example, if the role of the first field is a "wired" role, the first field (e.g., field 612) is wired to the third field, and the role of the third field is "internal", if the user inputs data that causes the calculation to output the number "47" to the third field, the number "47" will also be output to the first field. Thus, by wiring together fields (e.g., fields 608 and 612 by field 610) of the wiring view, the collection interface can create relationships between the fields within the collection interface that correspond to the first module interface and the second module interface, as well as the corresponding nodes and operations in the respective calculation graphs. In some embodiments, the user can input data to the second field via a drop down menu displaying the roles. In some embodiments, if a role assigned to a first field is a wired role, and the first field is wired to a second field that is incompatible (e.g., the first field is associated with a "decimal" type and the second field is associated with a "string" type), the UI builder tool may determine that the wired role is invalid and notify the user to assign a new role to the first field or the second field.

In some embodiments, the UI builder tool may also automatically populate fields in the wiring view corresponding to a third unique identifier if the user inputs additional unique identifiers to an instance view (e.g., user interface 500). The third unique identifier may be identical to the first unique identifier (e.g., "uuid1") or the second unique identifier (e.g., "uuid2"). In some cases, the third unique identifier corresponds to a third module corresponding to a third module interface. In all embodiments with a third unique identifier, the populated fields corresponding to the third unique identifier may be wired to the other fields in the wiring view. While only a third unique identifier is described above for simplicity, one of skill in the art would appreciate that any number of additional unique identifiers may be input to the instance view.

In some embodiments, if one of the unique identifiers is indicated, in the instance view, as a repeating unique identifier, the UI builder tool 106 automatically populates fields of the wiring view with fields from a module interface corresponding to the unique identifier based on the number indicated. In other embodiments, if one of the unique identifiers is indicated as a repeating unique identifier, the UI builder tool 106 automatically populates fields of a third UI view of the collection interface (a "table view") with fields from a module interface corresponding to the unique identifier based on the number indicated. If multiple unique identifiers are indicated as repeating modules in the instance view, the UI builder tool 106 will automatically populate a table view for each unique identifier indicated as repeating.

In some embodiments, the UI builder tool 106 automatically populates fields (e.g., the fields of set of fields 616) of the wiring view with the instance names corresponding to a respective unique identifier in the instance view. Each field in the instance view containing a unique identifier corresponds to another field where a user may input an instance name (e.g., fields in set of fields 514). The UI builder tool 106 may then automatically populate fields of the wiring view with the instance name in order to indicate which instance of the unique identifier certain fields correspond to (e.g., fields A4, A5, and A6 of set of fields 616 correspond to the "Dad" instance).

In some embodiments, the user may input data to a field (e.g., a field in set of fields 614) defining an explanation of the operation performed by the knowledge engine. In some cases, the explanation defined by the input data may be displayed in the client UI view of a computing device (e.g., computing device 104(2)) in response to input from a second computing device. In other cases, the explanation defined by the input data may be displayed without input from the second computing device. In yet another embodiment, the user may input the explanation data to a field of a third UI view of the collection interface (the "explainwhy view").

Once the UI builder tool 106 receives the input data from the wiring view, the generating component 114 can generate the collection code defining the calculation graphs, completeness graphs, and client UI view for the module collection.

After the generating component 114 generates the collection code, the collection code can be stored in the knowledge engine (e.g., in knowledge engine 108 at artifacts 124) with a unique identifier associated with the collection code. In some cases, the unique identifier can be used to create other module collections.

Example of Knowledge Engine Module Collection Input Data File For Executing a Calculation Graph FIG. 7 depicts an input data file 700 which is generated by the server based on input data to an instance view (e.g., user interface 500 as shown in FIG. 5) and a wiring view (e.g., user interface 600 as shown in FIG. 6) of a collection interface. Input data file 700 represents input data to be used by a knowledge engine (e.g., knowledge engine 108) when executing the calculation graph corresponding to a wiring view (e.g., user interface 600) of a collection interface.

As described above, input data files 400 and 402 represent input to be used by the knowledge engine when executing the calculation graphs corresponding to user interfaces 200 and 300 as described in FIGS. 2 and 3, respectively. Further, user interfaces 200 and 300 correspond to the first and second modules, respectively. Both the first and second modules are associated with unique identifiers (e.g., "uuid1" or "uuid2" as shown in FIG. 5) that may be input to an instance view (e.g., user interface 500) which populates a wiring view based on the first and second modules.

A generating component (e.g., generating component 114) may be configured to generate input data file 700 based on input test data to the wiring view. For example, input data file 700 contains a portion of code defining each set of fields corresponding to a unique identifier in the instance view (e.g., programming code 702 and 704 correspond to "uuid1" and programming code 706 corresponds to "uuid2") that causes the generating component to auto-populate the wiring view. Further, input data file 700 contains portions of code that are based on the input data to the wiring view. For example, programming code 702 of input data file 700 shows "John" and "1975-01-01" corresponding to input test data to the wiring view (e.g., data from set of fields 620), and similarly, programming code 704 shows "Jane", and "1972-02-02" corresponding to input test data to the wiring view (e.g., data from set of fields 618). Similar to input data files 400 and 402, input data file 700 is an example of input data that can be used by the knowledge engine by the knowledge engine when an API (e.g., API of APIs 126) is called by the user to test the module collection.

Further, the input data files representing the input to the wiring view may be organized based on the input data to instance view and the wiring view. For example, input data file 700 defines the "Dad" instance in programming code 702, the "Mom" instance in programming code 704, and the "AverageParentsAge" instance in programming code 706.

By using the collection interface to call an API and send input data file 700 to the knowledge engine, the user may effectively combine, implement, and test changes to a software program product without an extensive knowledge of coding or amount of resources. While input data files 400 and 402 both represent individual modules, which each represent new/modified rules and regulations to a software program product, input data file 700 may represent input data combining the two sets of new/modified rules and regulations for a more particular and effective change to the software program product without having to write or edit code.

Example User Interfaces of a Client UI View of a Knowledge Engine Module Collection FIGS. 8A-8I depict user interfaces 800, 820, 840, 860, and 880 displayed in the client UI view on a client computing device (e.g., computing device 104(2)). The user interfaces 800, 820, 840, 860, and 880 illustrate the client UI view that is generated based on the collection interface and the associated artifact file of the collection code, as described in FIG. 6.

As illustrated in FIG. 8A, a user interface 800 is displayed on a client computing device. The user interface 800 includes a title message and/or prompt (e.g., "Dad's Name") that is displayed to a user. The title message and/or prompt displayed in the user interface 800 corresponds to the input of a wiring view, (e.g., user interface 600) as described in FIG. 6. In some embodiments, the user may input data to the collection interface defining the title message and/or prompt to be displayed. In some cases, the input data defining the title message and/or prompt may be input to a separate view of the collection interface. Further, fields C4 and D4 determine what operation corresponds to the node in the calculation graph of the module collection (e.g., "input" from the client user in "string" form).

As illustrated in FIG. 8B, the user interface 800 is displayed on the client computing device. The user interface 800 includes input received from the client user (e.g., "John") in response to the initial title message and/or prompt.

As illustrated in FIG. 8C, a user interface 820 is displayed on a client computing device. The user interface 820 includes a title message and/or prompt (e.g., "Dad's Birthday") that is displayed to the user. The title message and/or prompt displayed in the user interface 820 corresponds to the input of a wiring UI view (e.g., user interface 600) as described in FIG. 6. In some embodiments, the user may input data to the collection interface defining the title message and/or prompt to be displayed. In some cases, the input data defining the title message and/or prompt may be input to a separate view of the collection interface. Further, fields C5 and D5 determine what operation corresponds to the node in the calculation graph of the module collection (e.g., "input" from the client user in "date" form).

As illustrated in FIG. 8D, a user interface 820 is displayed on the client computing device. The user interface 820 includes input received from the client user (e.g., "1/1/1975") in response to the initial title message and/or prompt.

As illustrated in FIG. 8E, a user interface 840 is displayed on a client computing device. The user interface 840 includes a title message and/or prompt (e.g., "Mom's Name") that is displayed to the user. The title message and/or prompt displayed in the user interface 840 corresponds to the input of a wiring view (e.g., user interface 600) as described in FIG. 6. In some embodiments, the user may input data to the collection interface defining the title message and/or prompt to be displayed. In some cases, the input data defining the title message and/or prompt may be input to a separate view of the collection interface. Further, fields C7 and D7 determine what operation corresponds to the node in the calculation graph of the module collection (e.g., "input" from the client user in "string" form).

As illustrated in FIG. 8F, a user interface 840 is displayed on the client computing device. The user interface 840 includes input received from the client user (e.g., "Jane") in response to the initial title message and/or prompt.

As illustrated in FIG. 8G, a user interface 860 is displayed on a client computing device. The user interface 860 includes a title message and/or prompt (e.g., "Mom's Birthday") that is displayed to the user. The title message and/or prompt displayed in the user interface 860 corresponds to the input of a wiring UI view (e.g., user interface 600) as described in FIG. 6. In some embodiments, the user may input data to the collection interface defining the title message and/or prompt to be displayed. In some cases, the input data defining the title message and/or prompt may be input to a separate view of the collection interface. Further, fields C8 and D8 determine what operation corresponds to the node in the calculation graph of the module collection (e.g., "input" from the client user in "date" form).

As illustrated in FIG. 811, a user interface 860 is displayed on the client computing device. The user interface 860 includes input received from the user (e.g., "2/2/1972") in response to the initial title message and/or prompt.

Figure 8I:
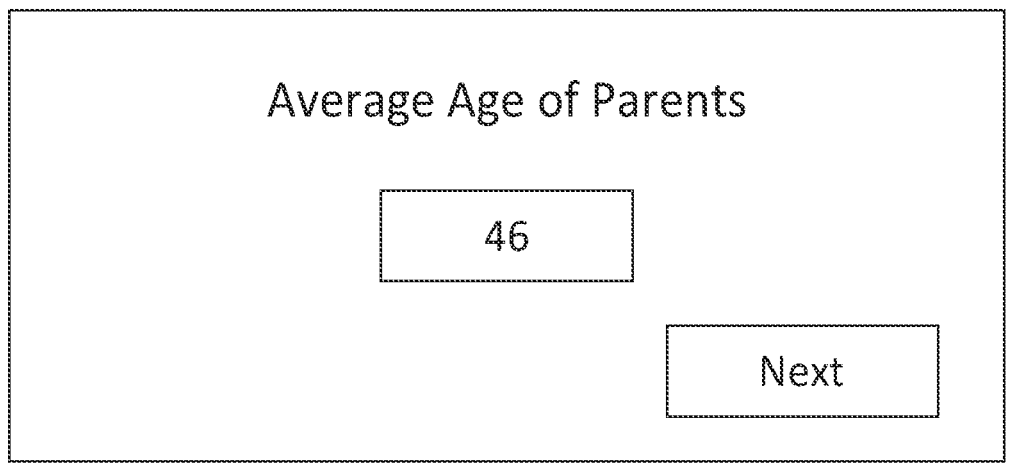

As illustrated in FIG. 8I, a user interface 880 is displayed on the client computing device. The user interface 880 includes a title (e.g. "Average Age of Parents") and an output result generated by the execution of a calculation graph and a completeness graph (e.g., "46"). In some embodiments, the user may input data to the collection interface defining the title message and/or prompt to be displayed. In some cases, the input data defining the title message and/or prompt may be input to a separate view of the collection interface. Further, the input data to fields C13 and D13 determine what operation corresponds to the node in the calculation graph of the module collection (e.g., "output" to display on the computing device in "decimal" form.) The calculation graph and completeness graph to generate the result is defined by the collection code of the module collection.

While FIGS. 8A-8I show only one input field in the client UI view per screen for simplicity, other embodiments can have multiple fields of input.

Further, it should be noted that multiple fields in user interface 600 correspond to nodes in the calculation graph but may not be shown in the client UI view. For example, the age at the start of the year for both the "Dad" and "Mom" instance is calculated and shown in fields E6 and E9 of user interface 600, but the role, assigned by the user, associated with those fields (e.g., "internal", "wired") prevents the data from appearing in any of user interfaces 800-880.

Example Method of Generating a Knowledge Engine Module Collection

Figure 9:
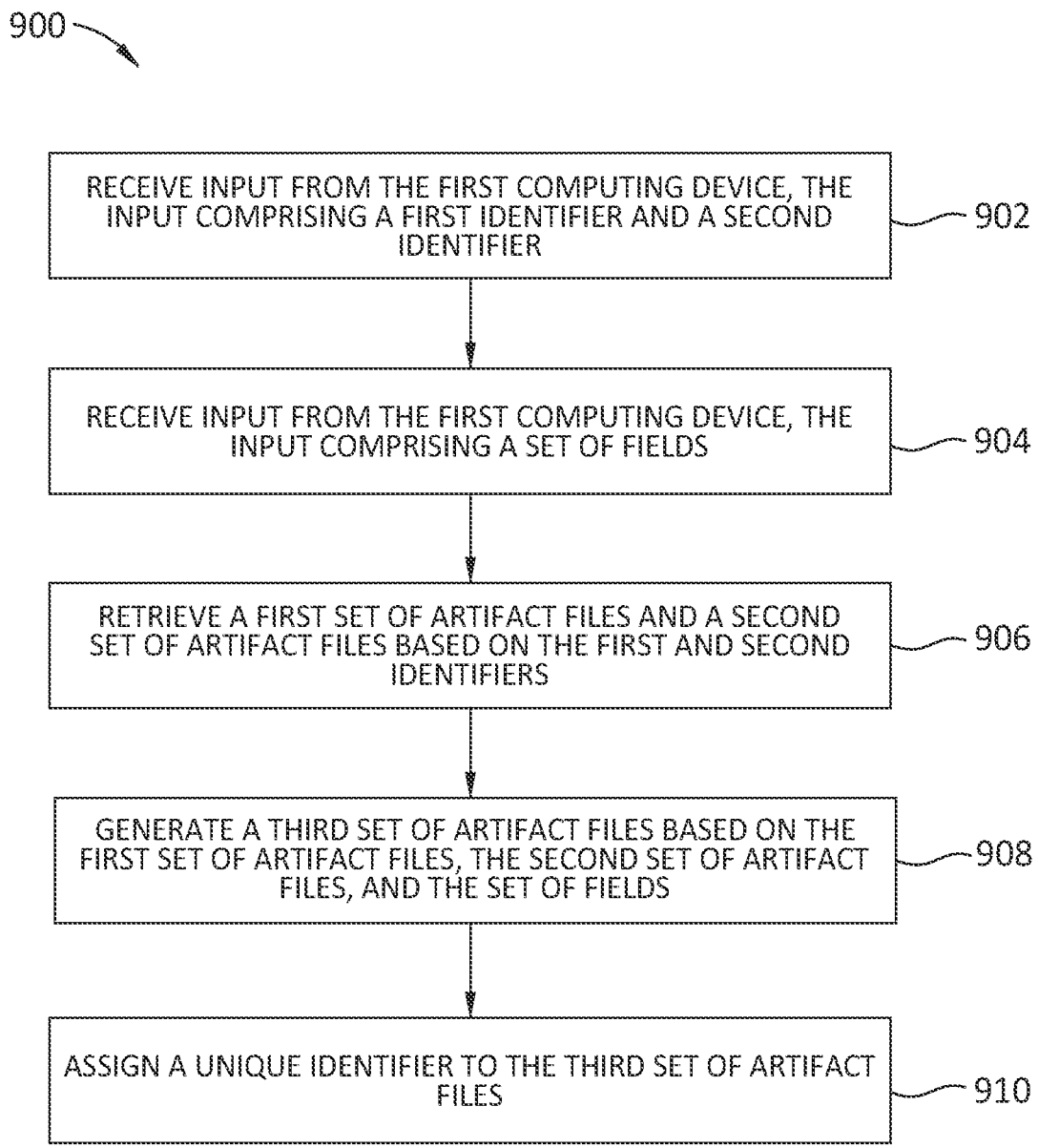
FIG. 9 depicts an example method of generating a module collection.

FIG. 9 depicts an example method 900 of generating a module collection, as described with respect to FIGS. 1 and 5-6.

At 902, the server receives input from the first computing device for a first UI view of a collection interface (the "instance view"). For example, when the instance view is provided to the computing device, the server can receive input data to populate a second UI view of the collection interface (the "wiring view") and generate a collection calculation graph, completeness graph, and client UI view based on user input. The input data to the instance view can include two or more unique identifiers (e.g., "uuid1" and "uuid2" as shown in FIG. 5). In some embodiments, the input data can also include two or more instance names (e.g., "Dad", "Mom", and "AverageParentsAge" of set of fields 514) corresponding to the unique identifiers. In other embodiments, the two or more unique identifiers can be identical. In other cases, the input data can indicate whether the unique identifier should be repeating.

At 904, the server receives input to a set of fields from the first computing device for the wiring view. In some embodiments, certain fields in the wiring view may be automatically populated based on the unique identifiers in the instance view. The input data to the fields of the wiring view can correspond to a node with a node description and include in the description the type of data to be entered. In some embodiments, the input data can assign a role of a field in the wiring view. In those embodiments, the input data can further assign that the role of the field is a "wired" role. If the input of a first field is a wired role, the first field is "wired" to a second field, which can link the input data between the fields (e.g., fields 608 and 612). In some cases, the input to the second field can become the input to the first field, or vice versa.

At 906, the server retrieves, from a knowledge engine (e.g., knowledge engine 108) the first set of artifact files, for example, a module code corresponding to the first module interface and the second set of artifact files, for example a different module code, corresponding to the second module interface.

At 908, the server generates a third set of artifact files, for example, a collection code, based on the first set of artifact files, the second set of artifact files, and input data to the wiring view. In some embodiments, the server stores the collection code in the knowledge engine (e.g., in artifacts 124) where the first module code and the second module code are also stored.

At 910, the server associates a unique identifier with the collection code. The unique identifier associated with the collection code can be used in the same way as the first and second unique identifiers (e.g., input to an instance view which will auto-populate a wiring view for another collection interface).

Figure 10:
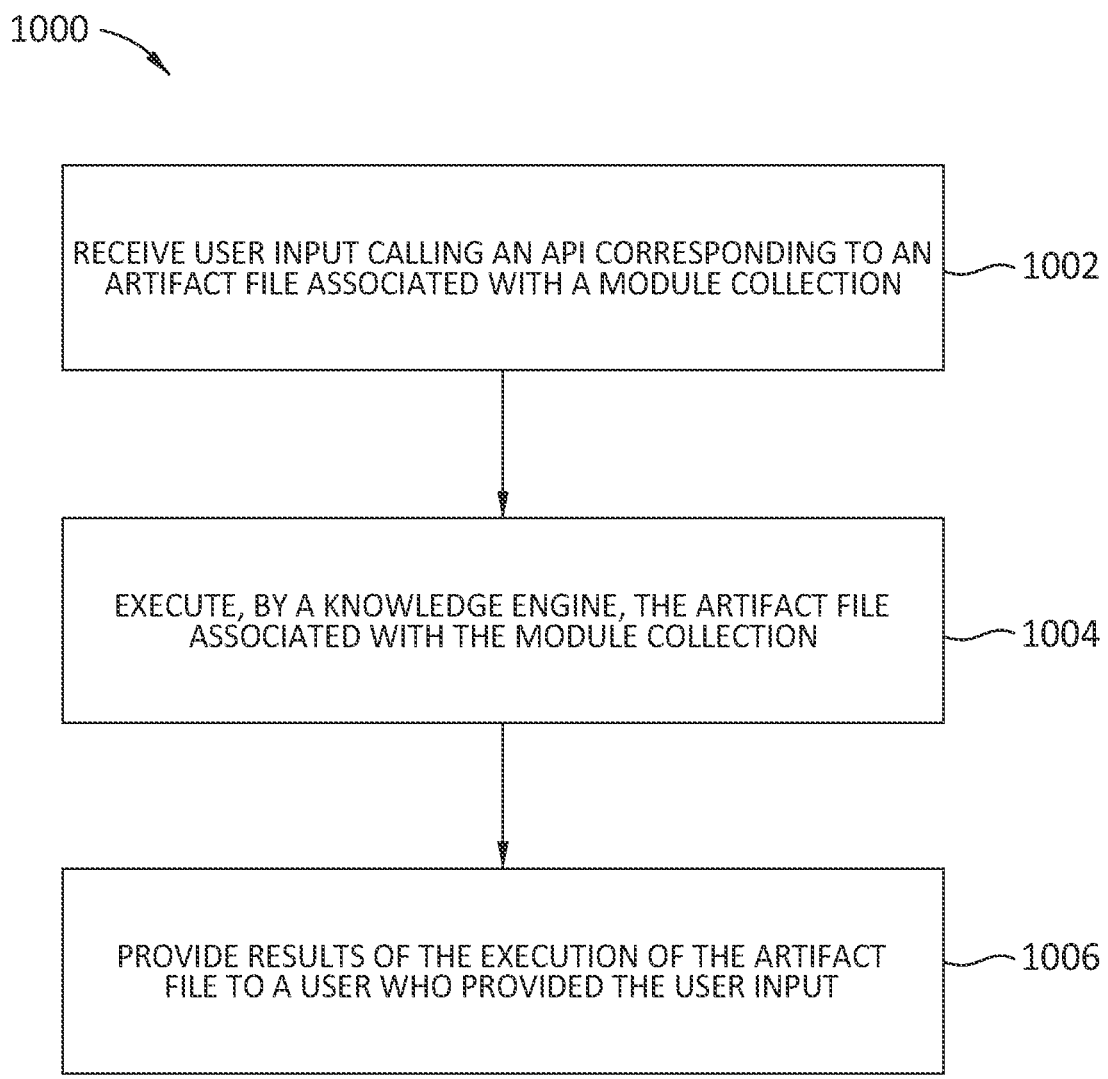
FIG. 10 depicts an example method of executing one or more artifact files of a module collection.

Example Method of Executing an Artifact File for the Knowledge Engine Module Collection FIG. 10 depicts an example method 1000 of executing the calculation graph, completeness graph, or client UI view associated with a module collection by a knowledge engine (e.g., knowledge engine 108) as described with respect to FIGS. 1 and 5-6.

At 1002, a server (e.g., server 102) may receive user input calling an API associated with a module collection (e.g., a module collection including user interfaces 500 and 600). Each API may be associated with one or more artifact files (e.g., a calculation graph, a completeness graph, or a client UI view) of the collection code associated with the module collection.

At 1004, based on the API that the user calls, the knowledge engine executes the artifact file of the collection code associated with the API, as described in FIG. 1. For example, a knowledge engine or knowledge engine service associated with the server can retrieve the generated artifact file associated with the called API and execute the calculation graph. In some embodiments, the knowledge engine receive an input data file (e.g., input data file 700) from the API to execute a test of the calculation graph. A separate artifact file defining the completeness graph may also be retrieved and the knowledge engine may execute the completeness graph. After executing the artifact file associated with the API, the knowledge engine returns the results of the execution.

At 1006, the server provides the results of the execution to a computing device of the user, (e.g., computing device 104(1)). Based on the results provided by the server, the user can change the input data to the collection interface.

Example Processing Device

Figure 11:
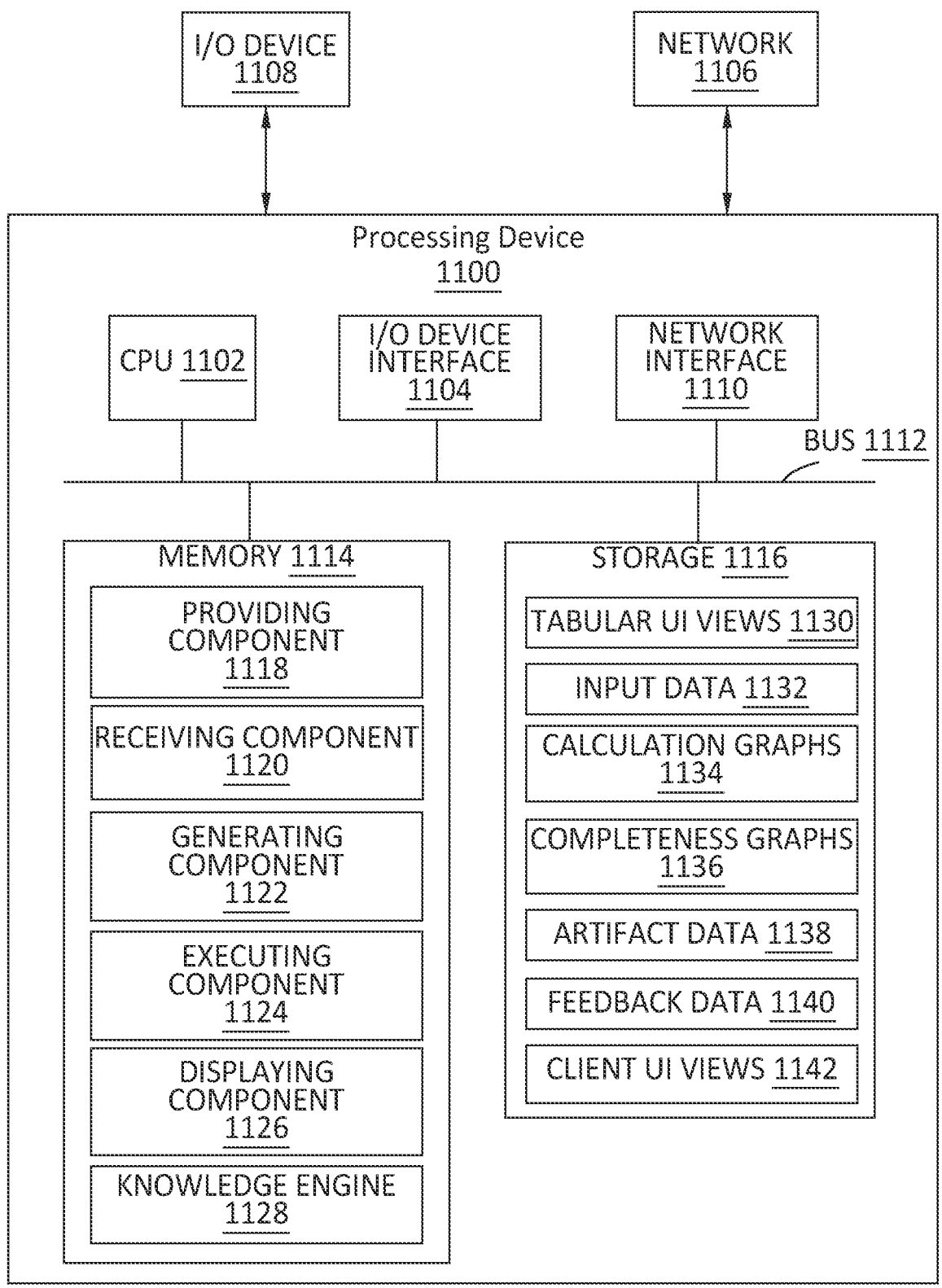
FIG. 11 depicts an example processing device.

FIG. 11 depicts an example processing device 1100 that may perform the methods described herein, for example, as described with respect to FIGS. 9-10. For example, the processing device 1100 can be a physical processing device or a virtual (e.g., cloud) server and is not limited to a single processing device that performs the methods described herein, for example, with respect to FIGS. 9-10.

Processing device 1100 includes a central processing unit (CPU) 1102 connected to a data bus 1112. CPU 1102 is configured to process computer-executable instructions, e.g., stored in memory 1114 or storage 1116, and to cause the processing device 1100 to perform methods described herein, for example, with respect to FIGS. 9-10. CPU 1102 is included to be representative of a single CPU, multiple CPUs, a single CPU having multiple processing cores, and other forms of processing architecture capable of executing computer-executable instructions.

Processing device 1100 further includes input/output (I/O) device(s) 1108 and interfaces 1104, which allows processing device 1100 to interface with input/output devices 1108, such as, for example, keyboards, displays, mouse devices, pen input, and other devices that allow for interaction with processing device 1100. Note that processing device 1100 may connect with external I/O devices through physical and wireless connections (e.g., an external display device).

Processing device 1100 further includes a network interface 1110, which provides processing device 1100 with access to external network 1106 and thereby external computing devices.

Processing device 1100 further includes memory 1114, which in this example includes a providing component 1118, a receiving component 1120, a generating component 1122, an executing component 1124, a displaying component 1126, and a knowledge engine 1128 for performing the operations as described in FIGS. 9-10.

Note that while shown as a single memory 1114 in FIG. 11 for simplicity, the various aspects stored in memory 1114 may be stored in different physical memories, but all accessible by CPU 1102 via internal data connections such as bus 1112.

Storage 1116 further includes UI views 1130, which may include a set of UI views provided to a computing device to generate a client UI, as described in FIGS. 1-10.

Storage 1116 further includes input data 1132, as described in FIGS. 1-10. The input data 1132 may include data input to the set of UI views from a computing device generating the client UI. The input data may further include data input to the client UI.

Storage 1116 further includes calculation graphs 1134, which may include calculation graphs generated by the server based on input from a set of UI views of a computing device, as described in FIGS. 1-10.

Storage 1116 further includes completeness graphs 1136, which may include completeness graphs generated by the server based on input from a set of views of a computing device, as described in FIGS. 1-10.

Storage 1116 further includes artifact data 1138, which includes artifact data, as described in FIGS. 1, 4, and 7.

Storage 1116 further includes feedback data 1140, which includes feedback data generated and provided to a computing device generating a client UI with the set of UI views (e.g., in real time), as described in FIG. 1.

Storage 1116 further includes client UI views 1142, which includes client UI views generated by a computing device with a set of UI views and displayed in a computing device (e.g., the same or different computing device that generated the client UI view), as described in FIGS. 1, 8A-8I, and 9-10.

While not depicted in FIG. 11, other aspects may be included in storage 1116.

As with memory 1114, a single storage 1116 is depicted in FIG. 11 for simplicity, but various aspects stored in storage 1116 may be stored in different physical storages, but all accessible to CPU 1102 via internal data connections, such as bus 1112, or external connections, such as network interfaces 1104. One of skill in the art will appreciate that one or more elements of processing device 1100 may be located remotely and accessed via a network 1106.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of creating a module collection, comprising:
   receiving a first input in a first user interface, comprising:
      a first identifier corresponding to a first module, wherein the first module comprises a first set of fields, wherein each field in the first set of fields corresponds to a node in a knowledge engine, wherein each node corresponds to an operation of the knowledge engine; and
      a second identifier corresponding to a second module, wherein the second module comprises a second set of fields, wherein each field in the second set of fields corresponds to a node in a knowledge engine, wherein each node corresponds to an operation of the knowledge engine;
   receiving a second input in the first user interface, comprising:
      a third set of fields, wherein each field in the third set of fields creates a relationship between at least one field in the first set of fields and one field in the second set of fields, wherein each field in the third set of fields is assigned, in the first user interface, a role from a set of roles, wherein at least one field of the third set of fields is assigned a wired role, wherein an input to a first field assigned the wired role in the third set of fields corresponds to an input of a second field in the third set of fields;
   retrieving, from an artifact repository, a first set of artifact files corresponding to the first module and second set of artifact files corresponding to the second module; and
   generating a third set of artifact files based on the first set of artifact files, the second set of artifact files, and the relationship between at least one field in the first set of fields and one field in the second set of fields, wherein the third set of artifact files corresponds to the second input.

2. The method of claim 1, further comprising:
   generating the first set of artifact files corresponding to the first module;
   generating the second set of artifact files corresponding to the second module; and
   storing the first set of artifact files and the second set of artifact files in the artifact repository.

3. The method of claim 1, wherein,
   the first input further comprises:
      a first instance name corresponding to the first module;
      a first instance name corresponding to the second module; and
      a second instance name corresponding to the first module; and
   the third set of fields further comprises:
      a first subset of fields of the third set of fields corresponding to the first instance name corresponding to the first module;
      a second subset of fields of the third set of fields corresponding to the first instance name corresponding to the second module; and
      a third subset of fields of the third set of fields corresponding to the second instance name corresponding to the first module.

4. The method of claim 1, further comprising:
determining that the wired role assigned to the first field is invalid;
providing a notification based on the determining that the wired role is invalid;
receiving a third input to a third field in the third set of fields;
assigning a role to the third field based on the third input; and
wiring the third field to the first field based on the third input.

5. The method of claim 1, wherein,
the first input further comprises a repetition indicator corresponding to the first module; and
the method further comprises executing an artifact file of the third set of artifact files a number of times associated with the repetition indicator.

6. The method of claim 1, further comprising assigning a third identifier to the module collection, wherein the module collection comprises the first input and the second input, wherein the module collection is based on the third set of artifact files.

7. A system comprising:
one or more processors; and
a memory storing instructions, which when executed by the one or more processors, cause the system to:
  receive a first input in a first user interface, comprising:
    a first identifier corresponding to a first module, wherein the first module comprises a first set of fields, wherein each field in the first set of fields corresponds to a node in a knowledge engine, wherein each node corresponds to an operation of the knowledge engine;
    a second identifier corresponding to a second module, wherein the second module comprises a second set of fields, wherein each field in the second set of fields corresponds to a node in a knowledge engine, wherein each node corresponds to an operation of the knowledge engine; and
    a repetition indicator corresponding to the first module;
  receive a second input in the first user interface, comprising:
    a third set of fields, wherein each field in the third set of fields creates a relationship between at least one field in the first set of fields and one field in the second set of fields;
  retrieve, from an artifact repository, a first set of artifact files corresponding to the first module and second set of artifact files corresponding to the second module;
  generate a third set of artifact files based on the first set of artifact files, the second set of artifact files, and the relationship between at least one field in the first set of fields and one field in the second set of fields, wherein the third set of artifact files corresponds to the second input; and
  execute an artifact file of the third set of artifact files a number of times associated with the repetition indicator.

8. The system of claim 7, wherein the instructions, when executed by the one or more processors, further cause the system to:
generate the first set of artifact files corresponding to the first module;
generate the second set of artifact files corresponding to the second module; and
store the first set of artifact files and the second set of artifact files in the artifact repository.

9. The system of claim 7, wherein each field in the third set of fields is assigned, in the first user interface, a role from a set of roles, wherein at least one field is assigned a wired role, wherein an input to a first field assigned the wired role in the third set of fields corresponds to an input of a second field in the third set of fields.

10. The system of claim 9, wherein the instructions, when executed by the one or more processors, further cause the system to:
determine that the wired role assigned to the first field is invalid;
provide a notification based on the determining that the wired role is invalid;
receive a third input to a third field in the third set of fields;
assign a role to the third field based on the third input; and
wire the third field to the first field based on the third input.

11. The system of claim 7, wherein,
the first input further comprises:
  a first instance name corresponding to the first module;
  a first instance name corresponding to the second module; and
  a second instance name corresponding to the first module; and
the third set of fields further comprises:
  a first subset of fields of the third set of fields corresponding to the first instance name corresponding to the first module;
  a second subset of fields of the third set of fields corresponding to the first instance name corresponding to the second module; and
  a third subset of fields of the third set of fields corresponding to the second instance name corresponding to the first module.

12. The system of claim 7, wherein the instructions, when executed by the one or more processors, further cause the system to assign a third identifier to a module collection, wherein the module collection comprises the first input and the second input, wherein the module collection is based on the third set of artifact files.

13. A non-transitory computer-readable medium comprising instructions that, when executed by a processor of a processing system, cause the processing system to perform a method of creating a module collection, comprising:
receiving a first input in a first user interface, comprising:
  a first identifier corresponding to a first module, wherein the first module comprises a first set of fields, wherein each field in the first set of fields corresponds to a node in a knowledge engine, wherein each node corresponds to an operation of the knowledge engine; and
  a second identifier corresponding to a second module, wherein the second module comprises a second set of fields, wherein each field in the second set of fields corresponds to a node in a knowledge engine, wherein each node corresponds to an operation of the knowledge engine;
receiving a second input in the first user interface, comprising:
  a third set of fields, wherein each field in the third set of fields creates a relationship between at least one field in the first set of fields and one field in the second set of fields, wherein each field in the third set of fields is assigned, in the first user interface, a role from a set of roles, wherein at least one field of the third set of fields is assigned a wired role, wherein an input to a first field assigned the wired role in the third set of fields corresponds to an input of a second field in the third set of fields;

retrieving, from an artifact repository, a first set of artifact files corresponding to the first module and second set of artifact files corresponding to the second module; and generating a third set of artifact files based on the first set of artifact files, the second set of artifact files, and the relationship between at least one field in the first set of fields and one field in the second set of fields, wherein the third set of artifact files corresponds to the second input.

14. The non-transitory computer-readable medium of claim 13, the method further comprising:
   generating the first set of artifact files corresponding to the first module;
   generating the second set of artifact files corresponding to the second module; and
   storing the first set of artifact files and the second set of artifact files in the artifact repository.

15. The non-transitory computer-readable medium of claim 13, wherein,
   the first input further comprises:
      a first instance name corresponding to the first module;
      a first instance name corresponding to the second module; and
      a second instance name corresponding to the first module; and
   the third set of fields further comprises:
      a first subset of fields of the third set of fields corresponding to the first instance name corresponding to the first module;
      a second subset of fields of the third set of fields corresponding to the first instance name corresponding to the second module; and
      a third subset of fields of the third set of fields corresponding to the second instance name corresponding to the first module.

16. The non-transitory computer-readable medium of claim 13, the method of further comprising:
   determining that the wired role assigned to the first field is invalid;
   providing a notification based on the determining that the wired role is invalid;
   receiving a third input to a third field in the third set of fields;
   assigning a role to the third field based on the third input; and
   wiring the third field to the first field based on the third input.

17. The non-transitory computer-readable medium of claim 13, the method further comprising assigning a third identifier to the module collection, wherein the module collection comprises the first input and the second input, wherein the module collection is based on the third set of artifact files.

* * * * *